(12) United States Patent
Nishiyama et al.

(10) Patent No.: US 9,787,493 B2
(45) Date of Patent: Oct. 10, 2017

(54) COMMUNICATION APPARATUS, CONTROL APPARATUS, AND PROGRAM

(71) Applicants: Hirohito Nishiyama, Tokyo (JP); Tatsunori Tsujimura, Tokyo (JP); Shuichiro Senda, Tokyo (JP); Masuo Ito, Tokyo (JP); Makoto Isoda, Tokyo (JP); Shigekazu Okamura, Tokyo (JP); Daisuke Tanimoto, Tokyo (JP)

(72) Inventors: Hirohito Nishiyama, Tokyo (JP); Tatsunori Tsujimura, Tokyo (JP); Shuichiro Senda, Tokyo (JP); Masuo Ito, Tokyo (JP); Makoto Isoda, Tokyo (JP); Shigekazu Okamura, Tokyo (JP); Daisuke Tanimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 112 days.

(21) Appl. No.: 14/766,054

(22) PCT Filed: Mar. 1, 2013

(86) PCT No.: PCT/JP2013/055656
§ 371 (c)(1),
(2) Date: Aug. 5, 2015

(87) PCT Pub. No.: WO2014/132437
PCT Pub. Date: Sep. 4, 2014

(65) Prior Publication Data
US 2015/0372837 A1  Dec. 24, 2015

(51) Int. Cl.
*H04L 12/40* (2006.01)
*H04J 3/16* (2006.01)
*H04L 29/08* (2006.01)

(52) U.S. Cl.
CPC .......... *H04L 12/40156* (2013.01); *H04J 3/16* (2013.01); *H04L 12/4015* (2013.01); *H04L 67/12* (2013.01)

(58) Field of Classification Search
CPC .... G08G 9/02; G08G 1/096716; G06Q 10/06; H04J 3/16; H04L 12/4015; H04L 67/12; H04L 12/40156
See application file for complete search history.

(56) References Cited

U.S. PATENT DOCUMENTS 4,939,725 A    7/1990  Matsuda et al.
6,665,601 B1 * 12/2003 Nielsen .................. H04L 12/40
                                                        701/50

(Continued)

FOREIGN PATENT DOCUMENTS

JP          2-1649 A    1/1990
JP         6-30003 A    2/1994

(Continued)

OTHER PUBLICATIONS

International Search Report dated Mar. 26, 2013 in PCT/JP13/055656 Filed Mar. 1, 2013.

(Continued)

*Primary Examiner* — Andrew Lai
*Assistant Examiner* — Chuong M Nguyen
(74) *Attorney, Agent, or Firm* — Oblon, McClelland, Maier & Neustadt, L.L.P.

(57) ABSTRACT

Control information from a plurality of applications 1000 is written into a shared memory 101 as needed. A communication part 105 transmits the control information written in the shared memory 101 to a DHM 200 in each transmission cycle which is constant. In a management table, a plurality of allowable delay times is defined, the allowable delay time being a delay time allowable at an urgent transmission of the (Continued)

control information. A transmission timing notification part 106 divides a transmission cycle into time slots each of which is equal to or shorter than the shortest allowable delay time defined in the management table. The communication part 105 transmits the control information in the shared memory 101 to the DHM 200 before arrival of the transmission cycle, in a unit of time slot.

15 Claims, 9 Drawing Sheets

(56) References Cited

U.S. PATENT DOCUMENTS

| | | | | |
|---|---|---|---|---|
| 7,450,541 B2* | 11/2008 | Fernandez-Corbaton | | H04W 56/0005 |
| | | | | 370/329 |
| 8,520,695 B1* | 8/2013 | Rubin | ................... | G08G 9/02 |
| | | | | 370/337 |
| 2003/0083079 A1* | 5/2003 | Clark | ............... | G08G 1/096716 |
| | | | | 455/466 |
| 2006/0034239 A1* | 2/2006 | Abeta | ................. | H04B 7/2618 |
| | | | | 370/341 |
| 2006/0194566 A1* | 8/2006 | Oesterling | ............ | H04M 11/04 |
| | | | | 455/404.1 |
| 2007/0106437 A1* | 5/2007 | Kim | ...................... | G06Q 10/06 |
| | | | | 701/31.4 |
| 2009/0196275 A1 | 8/2009 | Damnjanovic et al. | | |
| 2012/0307702 A1 | 12/2012 | Nakae et al. | | |

FOREIGN PATENT DOCUMENTS

| | | | |
|---|---|---|---|
| JP | 2006-180205 | A | 7/2006 |
| JP | 2006-191337 | A | 7/2006 |
| JP | 2006180205 | A * | 7/2006 |
| JP | 2010-137612 | A | 6/2010 |
| JP | 2011-511587 | A | 4/2011 |
| JP | 2011-244142 | A | 12/2011 |
| JP | 2012-156803 | A | 8/2012 |
| WO | 2012/086151 | A1 | 6/2012 |

OTHER PUBLICATIONS

Office Action dated Dec. 1, 2015 in Japanese Patent Application No. 2015-502689 (with English language translation).

U.S. Appl. No. 14/370,106, filed Jul. 1, 2014, Hirohito Nishiyama.

* cited by examiner

Fig. 2

MANAGEMENT TABLE

| ITEMS | MONITORING TARGET BIT | URGENT TRANSMISSION DETECTION CONDITION | ALLOWABLE DELAY TIME |
|---|---|---|---|
| URGENT TRANSMISSION CONDITION #1 | BIT0 | 0→1 | 20ms |
| URGENT TRANSMISSION CONDITION #2 | BIT1 | 0→1 | 50ms |
| URGENT TRANSMISSION CONDITION #3 | BIT2 | 0→1 | 30ms |
| URGENT TRANSMISSION CONDITION #4 | BIT3 | 1→0 | 20ms |
| URGENT TRANSMISSION CONDITION #5 | BIT4 | 0→1, 1→0 | 40ms |

Fig. 7

MANAGEMENT TABLE

| ITEMS | MONITORING TARGET BIT | DETECTION CONDITION | ALLOWABLE DELAY TIME |
|---|---|---|---|
| EVENT TRANSMISSION CONDITION #1 | BIT0 | 0→1 | 20ms |
| EVENT TRANSMISSION CONDITION #2 | BIT1 | 0→1 | 50ms |
| EVENT TRANSMISSION CONDITION #3 | BIT2 | 0→1 | 30ms |
| EVENT TRANSMISSION CONDITION #4 | BIT3 | 1→0 | 20ms |
| EVENT TRANSMISSION CONDITION #5 | BIT4 | 0→1, 1→0 | 40ms |

COMMUNICATION APPARATUS, CONTROL APPARATUS, AND PROGRAM

TECHNICAL FIELD

The present invention relates to a technology that makes data transmission more efficient.

Hereinafter, the technology that makes data transmission more efficient will mainly be described with an on-vehicle system as an example.

BACKGROUND ART

In a body system of a vehicle, an ECU (Electro Control Unit) called a Body Control Module (BCM: Body Control Module) controls an I/O (Input/Output) device which is connected to the ECU by a dedicated line. There is a problem in that the number of signal lines increases as the number of control targets increases.

To solve the problem above, Patent Literature 1 discloses a method to control I/O devices by storing a status signal of each I/O device in each multiplex transmission apparatus arranged in each part of a vehicle, and connecting the multiplex transmission apparatus and the BCM by a multiplex transmission line.

Patent Literature 2 discloses a method in which when there is a change in input information from an I/O device, in a communication system that adopted a multiplex transmission apparatus such as the above, the multiplex transmission apparatus transmits the input information that changed to the BCM, thereby a BCM is able to detect the change in input information in a short period of time.

CITATION LIST

Patent Literature

Patent Literature 1: JPH02-1649
Patent Literature 2: JPH06-30003

SUMMARY OF INVENTION

Technical Problem

The above multiplex transmission line is used not only for exchanging of data between in the BCM and the multiplex transmission apparatus, but also for exchanging of data between ECUs for lowering cost.

Since the data exchanged between the ECUs are used for controlling a body of a moving vehicle, and the like, a prescribed real-time property is required for the on-vehicle system.

Therefore, the input information from the multiplex transmission apparatus to the BCM and a change in control information from the BCM to the multiplex transmission apparatus are required to be notified in a short period of time, but on the other hand, data communication between the BCM and the multiplex transmission apparatus is required to be restrained to guarantee the real-time property.

In other words, it is necessary to restrain a communication band between the BCM and the multiplex transmission apparatus below a certain level so that other apparatuses can communicate.

In a method where the input information is transmitted from the multiplex transmission apparatus to the BCM every time the input information changes (or control information is transmitted from the BCM to the multiplex transmission apparatus every time control information to the I/O device is updated), it is necessary to constantly allot, to the BCM and the multiplex transmission apparatus, a communication band that is high enough in a situation where changes in the input information (or updates in the control information) occur intensively in a certain period of time.

Therefore, there is a problem that guaranteeing enough communication band to other apparatuses that uses the multiplex transmission line is not possible.

The present invention is conceived in light of such a situation described above. That is, the present invention mainly aims to realize a configuration where specific data is transmitted without delay while restraining the communication band.

Solution to Problem

A communication apparatus includes:

a transmission information storage part where transmission information from a plurality of information sources is written as needed;

a first communication processing part that transmits the transmission information written in the transmission information storage part to a communication destination apparatus in each transmission cycle which is constant;

a condition information storage part that stores condition information that defines an urgent transmission information source which is an information source that is permitted to transmit the transmission information urgently before arrival of the transmission cycle, among the plurality of information sources, and defines an allowable delay time for each urgent transmission information source, which is a delay time allowable at an urgent transmission;

a time slot division part that divides the transmission cycle into time slots each of which is equal to or shorter than the shortest allowable delay time defined by the condition information;

an urgent transmission information extraction part that extracts in a unit of individual time slot, urgent transmission information which is transmission information from the urgent transmission information source and needs to be transmitted urgently, from among the transmission information written in the transmission information storage part; and a second communication processing part that transmits in the unit of individual time slot, the urgent transmission information extracted by the urgent transmission information extraction part to the communication destination apparatus before arrival of the transmission cycle.

Advantageous Effects of Invention

According to the present invention, because transmission information is transmitted in a prescribed transmission cycle, it is not necessary to constantly allot a high communication band for transmitting the transmission information, and the communication band may be allotted to other communication.

Furthermore, transmission information that needs to be transmitted urgently may be transmitted without delay in a unit of individual time slot.

BRIEF DESCRIPTION OF DRAWINGS

FIG. 2 a diagram illustrating an example of an urgency control information management table according to the first embodiment;

FIG. 7 a diagram illustrating an example of an event transmission condition management table according to the fourth embodiment;

DESCRIPTION OF EMBODIMENTS

Embodiment 1

In this first embodiment, a control apparatus that transmits transmission information for controlling a control target equipment to a relay apparatus will be described.

More specifically, the control apparatus including the following will be described:

a first communication processing part that collectively transmits a plurality of pieces of transmission information that occur at an arbitrary timing, in a transmission timing that arrives repeatedly;

a second communication processing part that transmits the transmission information by a transmission time limit of the transmission information when it becomes necessary to transmit the transmission information before the arrival of the transmission timing of the first communication processing part;

a condition information storage part that stores condition information which indicates a condition for the second communication processing part to transmit the transmission information, and indicates an allowable delay time that signifies the transmission time limit, which is a period of time from when the transmission of the transmission information becomes necessary until when the transmission information is transmitted; and an urgent transmission information extraction part that monitors occurrence status of the transmission information, and extracts transmission information that satisfies the condition indicated in the condition information, as an urgent transmission information, wherein the second communication processing part transmits to the communication destination apparatus the urgent transmission information extracted by the urgent transmission information extraction part, before the arrival of the transmission timing of the first communication processing part and before the transmission time limit, which is a time when the allowable delay time has passed after the urgent transmission information is extracted by the urgent transmission information extraction part.

Figure 1:
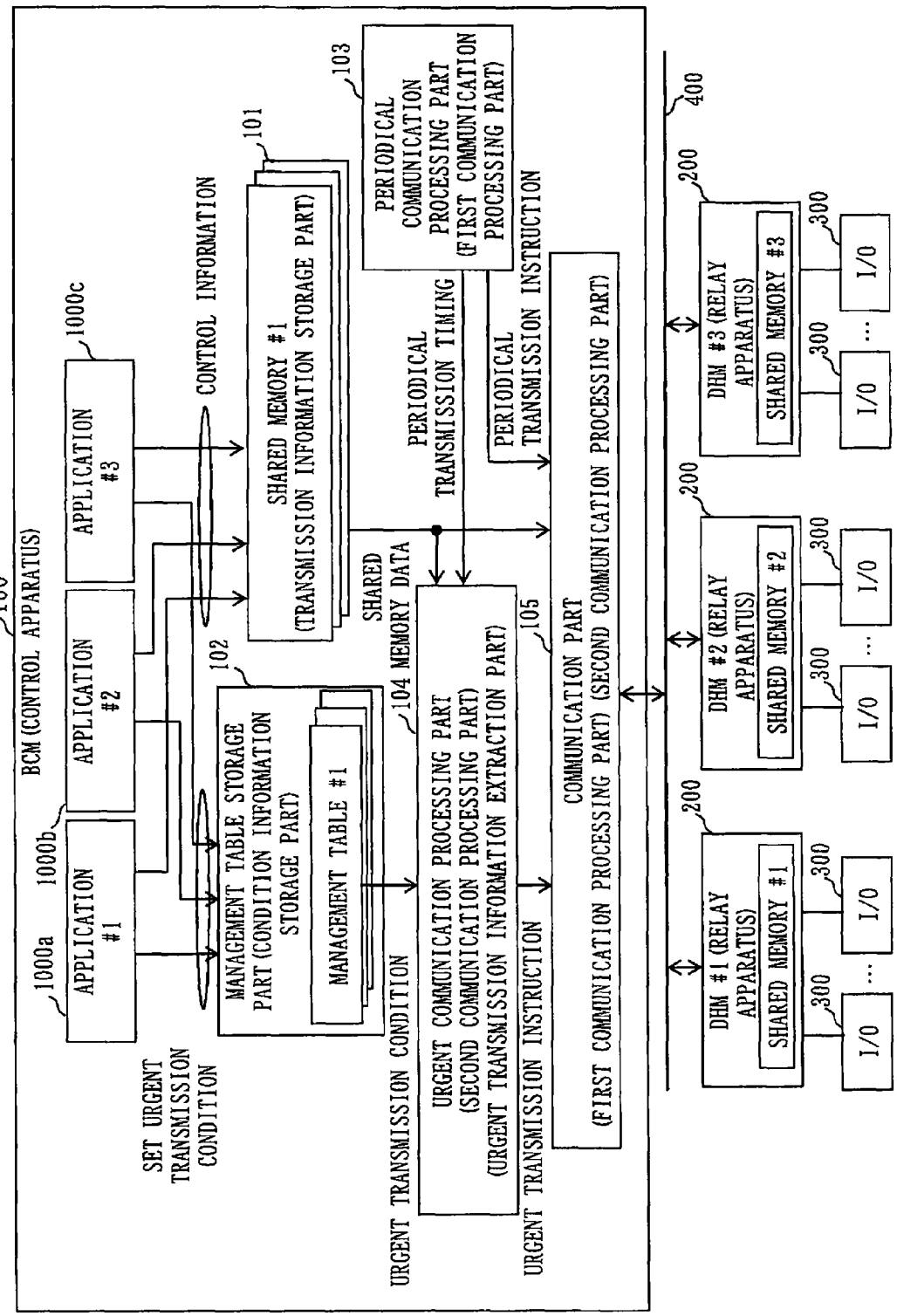
FIG. 1 a diagram illustrating an example of a configuration of an on-vehicle system according to a first embodiment.

FIG. 1 illustrates an example of configuration of an on-vehicle system according to the first embodiment.

A multiplex transmission apparatus 200 (hereinafter, also called a DHM 200) outputs control information transmitted by a BCM 100 being a controller, to I/O devices 300 which are to be connected to the DHM 200.

Communication of control information is carried out by using a shared memory.

A content of the shared memory is a group of the control information for a plurality of I/O devices 300 connected to the DHM 200.

Next, the BCM 100 according to the present embodiment transmits to the DHM 200, control information calculated by an application 1000, as shared memory data.

The shared memory data is transmitted to the DHM 200 basically in a periodical transmission. The DHM 200 outputs the shared memory data received to the I/O device 300.

With respect to the I/O device for which control through the periodical transmission is not in time and an urgent control is necessary, the BCM 100 transmits the control information to the DHM 200, not by the periodical transmission, but by the urgent transmission as needed. The control of the I/O device 300 is performed without waiting for the periodical transmission.

The BCM 100 corresponds to an example of the control apparatus, the I/O device 300 corresponds to an example of the control target equipment, and the DHM 200 connected to the I/O device 300 corresponds to an example of the relay apparatus.

A network (multiplex transmission line 400) that connects the DHM 200 and the BCM 100 is not prescribed in particular, but is, a CAN (Control Area Network), for example.

Next, elements inside the BCM 100 will be described in detail.

The application 1000 is for example, an application program for controlling a windshield wiper and a headlight of a vehicle.

The application 1000, calculates control information of the I/O device 300 that corresponds to the windshield wiper or the headlight based on input information such as switch information, for example, and outputs the control information to a shared memory 101.

Means for obtaining the input information such as the switch information is chosen arbitrarily, although not specified because it is not directly related to the present invention.

The application 1000 corresponds to an example of an information source.

The shared memory 101 stores the control information of the plurality of I/O devices 300 connected to the DHM 200.

The control information, which is output data for each I/O device 300, is expressed in 1 bit in a case of a contact output, and is a digitally converted 8 bit value in in a case of an analog output, for example.

A data format in the shared memory 101 is determined by a system design depending on the number and type of the I/O device connected.

The number of the shared memory 101 is equal to the number of DHM 200, with which the shared memory 101 communicates.

Each shared memory 101 is sectioned into areas each of which is for each application 1000.

Furthermore, there is an area for a monitoring target bit in each shared memory 101.

The monitoring target bit will be described later.

The shared memory 101 corresponds to an example of a transmission information storage part.

A periodical communication processing part 103 issues a periodical transmission instruction to a communication part 105 in a constant cycle.

The periodical communication processing part 103, together with the communication part 105 that will be described later, corresponds to an example of a first communication processing part.

When the periodical transmission instruction from the periodical communication processing part 103, or an urgent transmission instruction from an urgent communication processing part 104 which will be described later, are inputted, the communication part 105 reads out data in the shared memory 101, and transmits the data to the DHM 200.

The communication part 105, together with the periodical communication processing part 103, corresponds to an example of the first communication processing part.

The communication part 105, together with the urgent communication processing part 104, corresponds to an example of the second communication processing part.

A management table storage part 102 stores an urgency control information management table (referred to as management table in the figures).

The urgency control information management table is a table where the urgent transmission condition is written.

A setting value of the urgent transmission condition may be set in advance by the system design or may be set dynamically by the application 1000 as in FIG. 1.

The urgency control information management table is configured of the monitoring target bit, an urgent transmission detection condition, and an allowable delay time, as illustrated in FIG. 2.

The monitoring target bit indicates a bit location in the shared memory 101.

Each bit location indicated in a monitoring target bit column corresponds to the application 1000.

For example, bit 0 corresponds to an application #1 (1000a), and bit 1 corresponds to an application #2 (1000b).

And, the control information from the application 1000 that corresponds to the bit location indicated in the monitoring target bit column is allowed to be transmitted urgently before periodical transmission cycle arrives.

The application 1000 that corresponds to the bit location indicated in the monitoring target bit column corresponds to an example of an urgent transmission information source.

The urgent transmission detection condition is a condition for detecting the control information that should be transmitted urgently.

For example, in an example of an urgent transmission condition #1, when the application #1 (1000a) rewrites a value of bit 0 being the monitoring target bit, from 0 to 1, the urgent communication processing part 104 detects that an urgent transmission is necessary, the urgent communication processing part 104 will be described later.

The allowable delay time is an allowable delay time between when the application 1000 writes urgency control information being control information that should be transmitted urgently (an example of the urgent transmission information) into the shared memory 101 and when the shared memory data (the urgency control information) is transmitted to the DHM 200.

Time obtained by adding the allowable delay time to the time when the urgency control information is written into the shared memory 101 is a transmission time limit of the urgency control information.

The urgency control information management table corresponds to an example of the condition information, and the management table storage part 102 corresponds to an example of the condition information storage part.

The urgent communication processing part 104 examines whether or not the urgent transmission condition is satisfied by comparing the shared memory data, and the monitoring target bit and the urgent transmission detection condition registered in the urgency control information management table.

The urgent communication processing part 104 executes the examination every time the shared memory data or the urgency control information management table is updated.

If the urgent transmission condition is satisfied, the urgent communication processing part 104 registers the transmission time limit of the urgency control information in question as an urgency control information transmission timing unless a periodical transmission timing and a transmission time limit of any other urgency control information arrive within the allowable delay time.

And when the urgency control information transmission timing arrives, the urgent communication processing part 104 issues the urgent transmission instruction to the communication part 105.

If at this time, other urgency control information transmission timing has been already registered, the urgency control information transmission timing that has been registered is cancelled.

If the periodical transmission timing arrives within the allowable delay time, or if an urgency control information transmission timing of any other urgency control information that is within the allowable delay time has been registered, the urgent communication processing part 104 does not register the urgency control information transmission timing of the urgency control information in question because the urgency control information in question will be transmitted within the allowable delay time.

In other words, the urgent communication processing part 104 does not register the urgency control information transmission timing of the urgency control information in question because the urgency control information in question will be transmitted at a periodical transmission or at an urgency control information transmission timing of other urgency control information.

The urgent communication processing part 104 issues the urgent transmission instruction to the communication part 105 with the urgency control information transmission timing as a transmission time limit.

For example, it is possible to reduce a communication volume by controlling to transmit only shared memory data (control information) where the urgent transmission condition is satisfied at the urgency control information transmission timing.

Instead of the above, all of the shared memory data that exist in the shared memory 101 may be transmitted at the urgency control information transmission timing.

If another urgent transmission condition is satisfied before the transmission time limit, an existing transmission time limit is compared against a transmission time limit which is newly established. An earlier transmission time limit of the two is set as a new transmission time limit, and the urgent communication processing part 104 issues the urgent transmission instruction to the communication part 105.

The urgent communication processing part 104 corresponds to an example of the urgent transmission information extraction part.

A specific example of operation of the BCM 100 according to the present embodiment will be described.

In the present example, suppose that the BCM 100 periodically transmits the shared memory data in a 100 ms cycle with Time T0 as a basis.

Suppose that the application #1 (1000*a*) corresponds to an urgent transmission condition #1 of the urgency control information management table of FIG. 2, and the application #2 (1000*b*) corresponds to an urgent transmission condition #2 of the urgency control information management table of FIG. 2.

First, each application 1000 performs setting of an urgency control information management table at a time of initialization.

A static urgency control information management table may be stored in the management table storage part 102 in advance, in place of the application 1000 setting the urgency control information management table.

Next, a transmission procedure of the urgency control information will be described by referring to FIG. 3.

When an urgency control request #1 occurs in the application #1 at Time T0+30 ms, the application #1 rewrites bit 0 in the shared memory from 0 to 1.

The rewriting of the bit 0 in the shared memory 101 is detected by the urgent communication processing part 104, and is determined that rewriting of the bit 0 in the shared memory 101 matches with the monitoring target bit and the urgent transmission detection condition of the urgent transmission condition #1 in the urgency control information management table.

Thus, the urgent communication processing part 104 calculates that a transmission time limit of the urgency control information from the application #1 as T0+50 ms, which is time past the allowable delay time of the urgency control information from a shared memory rewriting time.

Next, the urgent communication processing part 104 checks whether or not there are other urgent transmissions before Time T0+50 ms.

Figure 3:
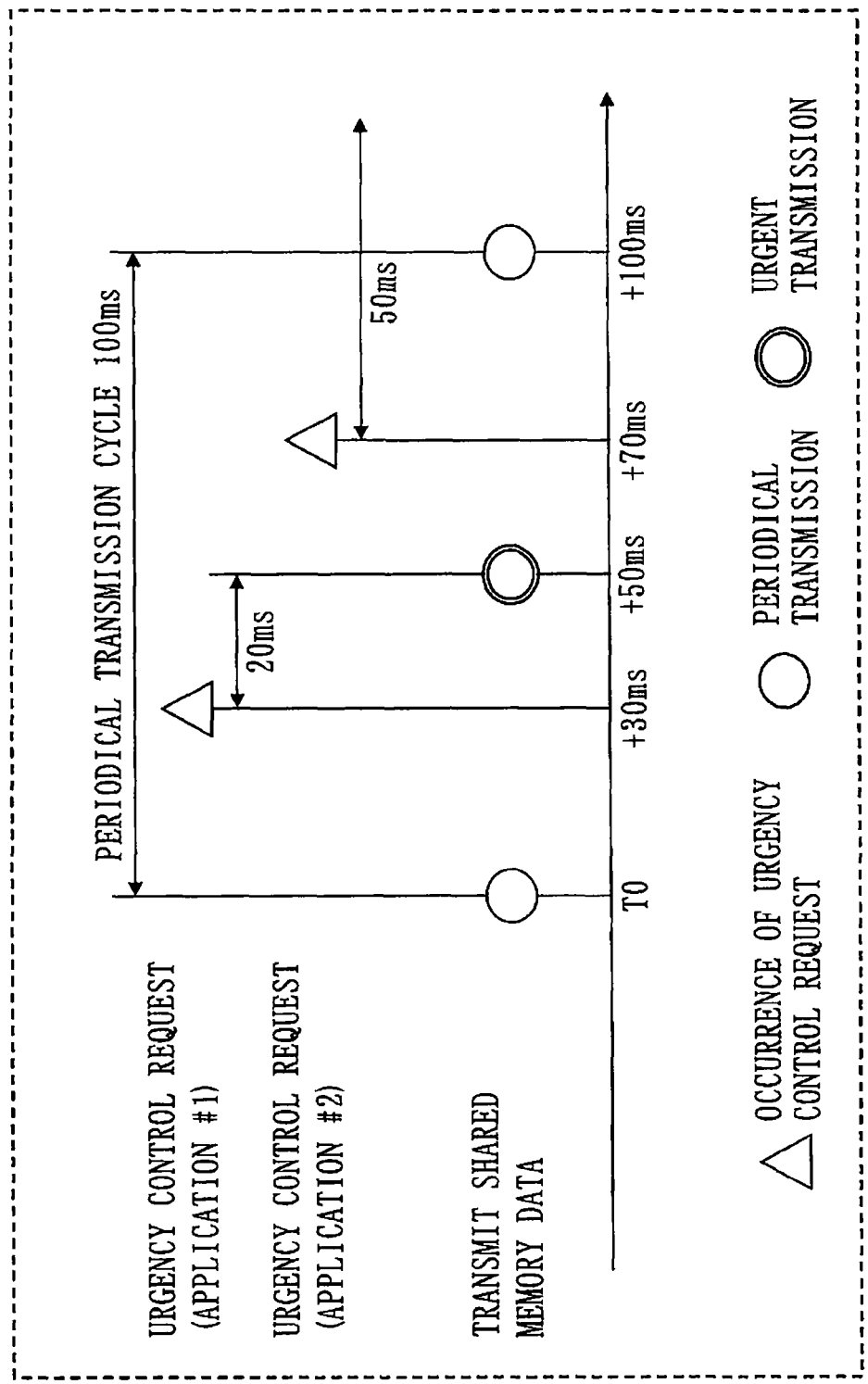
FIG. 3 a diagram illustrating a transmission procedure of the urgency control information according to the first embodiment.

In the example of FIG. 3, since there is no other urgent transmission before Time T0+50 ms, the urgent communication processing part 104 next checks whether or not a periodical transmission will be performed by Time T0+50 ms.

In the example of FIG. 3, since the next periodical transmission is at T0+100 ms, there will be no periodical transmission before Time T0+50 ms.

Since there is no other urgent transmission or a periodical transmission before the transmission time limit T0+50 ms of the urgency control information, the urgent communication processing part 104 registers T0+50 ms as a next transmission time limit, waits to transmit the urgency control information until T0+50 ms, and when it becomes T0+50 ms, issues the urgent transmission instruction to the communication part 105.

The communication part 105 reads out the urgency control information from the shared memory 101 upon receipt of the urgent transmission instruction, and transmits the urgency control information to the DHM 200.

Next, when an urgency control request #2 occurs in the application #2 at Time T0+70 ms, the application #2 rewrites bit 1 in the shared memory from 0 to 1.

The rewriting of the bit 1 in the shared memory 101 is detected by the urgent communication processing part 104, and is determined that rewriting of the bit 1 in the shared memory 101 matches with the monitoring target bit and the urgent transmission detection condition of the urgent transmission condition #2 in the urgency control information management table.

Thus, the urgent communication processing part 104 calculates that a transmission time limit of the urgency control information from the application #2 as T0+120 ms, which is time past the allowable delay time of the urgency control information from the shared memory rewriting time.

Next, the urgent communication processing part 104 checks whether or not there are other urgent transmissions before Time T0+120 ms.

In the example of FIG. 3, since there is no other urgent transmission before Time T0+120 ms, the urgent communication processing part 104 next checks whether or not a periodical transmission will be performed by Time T0+120 ms.

In the example of FIG. 3, since the next periodical transmission is at T0+100 ms, the periodical transmission is executed before Time T0+120 ms.

When periodical transmission is executed, an urgent transmission in response to the urgency control request will not be executed.

The urgent communication processing part 104 does not perform processing of the urgency control request, however, the urgency control request is transmitted to the DHM 200 by the periodical transmission at Time T0+100 ms, which is before the transmission time limit.

With a configuration such as the above, even if timings of urgent transmissions of a plurality of pieces of urgency control information occur intensively in a certain period of time, it is possible to prevent a network load from reaching or surpassing a prescribed level and to transmit the urgency control information to the DHM 200 within a prescribed time by the shared memory transmitting the plurality of pieces of urgency control information collectively.

Although the present embodiment describes an example of the BCM 100 transmitting the urgency control information to the DHM 200 at the transmission time limit, the BCM 100 may transmit the urgency control information before the transmission time limit.

Figure 5:
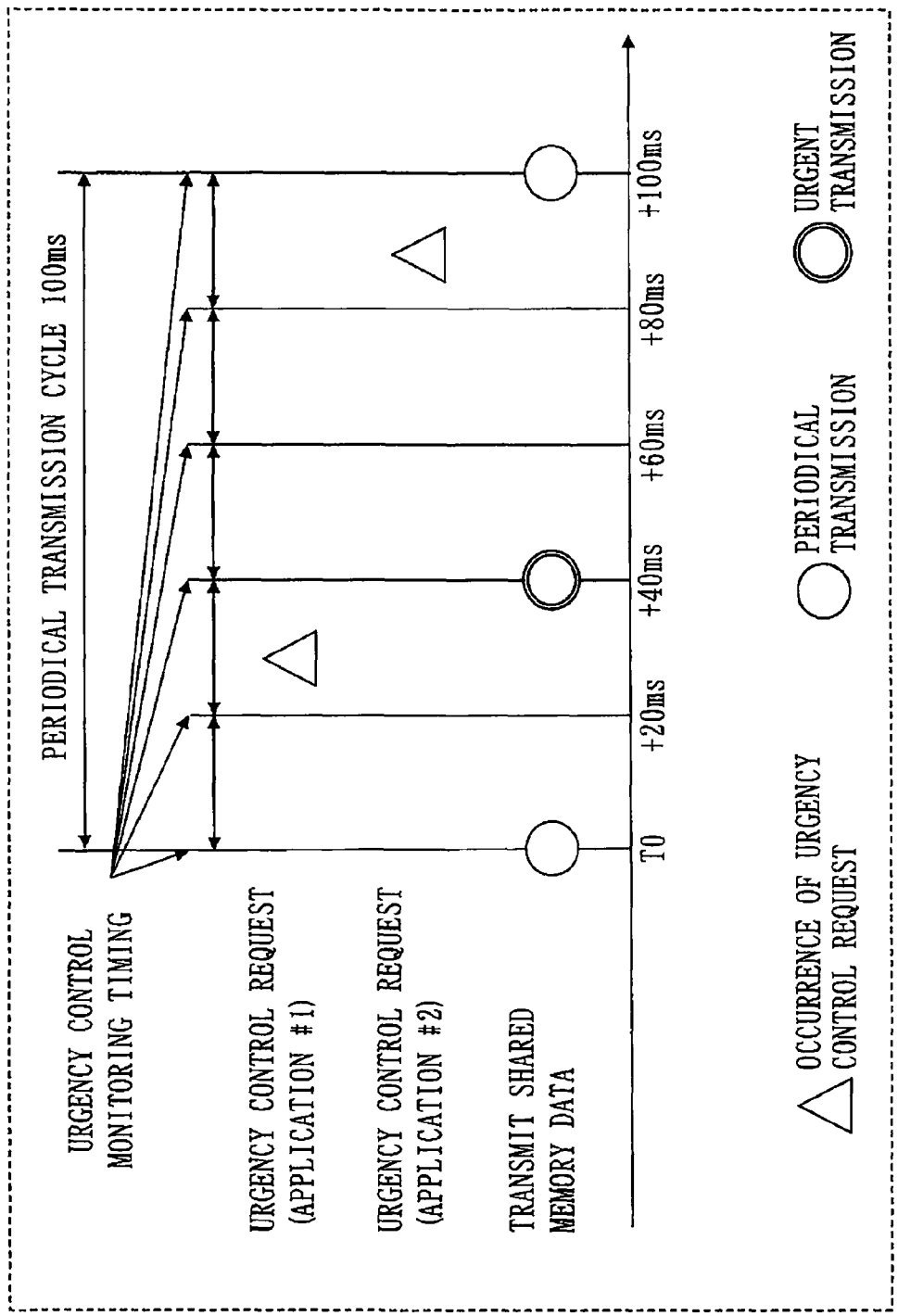
FIG. 5 a diagram illustrating a transmission procedure of urgency control information according to the second embodiment.

In an example of FIG. 5, the above describes that the BCM 100 transmits the urgency control information at Time T0+50 ms which is the transmission time limit, but the BCM 100 may transmit the urgency control information at Time T0+48 ms, for example.

The present embodiment has described a system configured of a controller that controls the system and one or more than one multiplex transmission apparatuses connected by one or more than one I/O devices that are controlled or referred to by the controller.

Further, the present embodiment has described that the controller periodically transmits control information for the plurality of I/O devices connected to the multiplex transmission apparatus collectively, and that the controller, if an urgency control output request occurs for the I/O device for which control through the periodical transmission is not in time, the data which is integration of the control information for the I/O devices is transmitted by the transmission time limit separately from the periodical transmission.

Further, the present embodiment has described that if a single or a plurality of control requests occur, the controller transmits the data which is the integration of the control information for the I/O devices as urgency control information at an earliest transmission time limit.

The present embodiment has also described that the controller transmits the urgency control information by the periodical transmission if the timing of the periodical transmission is earlier than the transmission time limit of the urgency control information.

The present embodiment has described as well that the controller includes the urgency control information management table that is capable of storing monitoring information of the urgency control output request of the I/O device for which control through the periodical transmission is not in time, and the allowable delay time from when the control information occurs until the control information is transmitted.

Furthermore, the present embodiment has described that the controller detects the occurrence of the urgency control information by the monitoring information in the urgency control information management table.

The present embodiment described that the monitoring information and the allowable delay time in the urgency control information management table may be set from the application or the outside of the controller.

Embodiment 2

Figure 4:
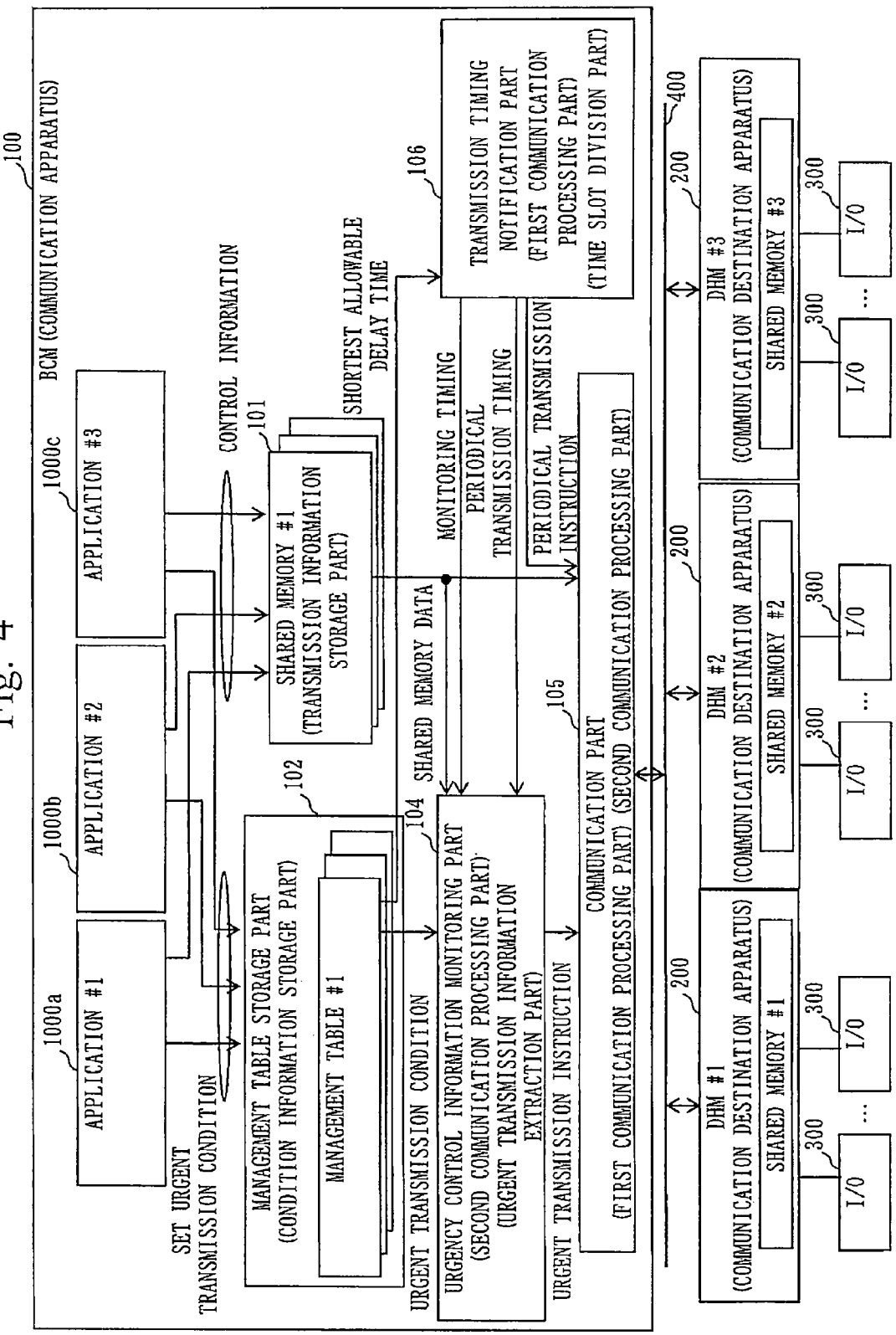
FIG. 4 a diagram illustrating an example of a configuration of an on-vehicle system according to a second embodiment.

FIG. 4 illustrates an example of a configuration of a BCM 100 of the present embodiment.

In the present embodiment, the BCM 100 corresponds to an example of a communication apparatus, and the DHM 200 corresponds to an example of a communication destination apparatus.

The BCM 100 of the present embodiment includes a transmission timing notification part 106 and an urgency control information monitoring part 107 that correspond to the periodical communication processing part 103 and the urgent communication processing part 104 of the BCM 100 of the first embodiment.

The transmission timing notification part 106 functions to issue a periodical transmission instruction to a communication part 105 at a periodical transmission timing.

The transmission timing notification part 106 generates a time slot whose unit of time is the shortest allowable delay time among the allowable delay time registered in the urgency control information management table, within a periodical transmission cycle.

The transmission timing notification part 106 provides a monitoring instruction of shared memory data to the urgency control information monitoring part 107 as a monitoring timing signal, for each time slot.

As described, the transmission timing notification part 106 divides a transmission cycle into time slots, each being the shortest allowable delay time defined in the urgency control information management table, and the transmission timing notification part 106 corresponds to an example of a time slot division part.

The transmission timing notification part 106 issues the periodical transmission instruction to the communication part 105, and also corresponds to an example of the first communication processing part.

The urgency control information monitoring part 107 monitors a shared memory 101 in each time slot according to the monitoring timing signal from the transmission timing notification part 106.

Then, the urgency control information monitoring part 107 extracts control information (urgency control information) that matches an urgent transmission condition defined in the urgency control information management table, from the control information written in the shared memory 101.

In addition, the urgency control information monitoring part 107 issues an urgent transmission instruction to the communication part 105 as in a similar manner described in the first embodiment, for the control information that matches the urgent transmission condition.

The urgency control information monitoring part 107, however, does not issue the urgent transmission instruction in a time slot where periodical transmission is performed, even if the urgent transmission condition is satisfied.

The urgency control information monitoring part 107 is able to detect the time slot where periodical transmission is performed, using an input of a periodical transmission timing signal from the transmission timing notification part 106.

In the present embodiment, the urgency control information monitoring part 107 corresponds to an example of the second communication processing part and the urgent transmission information extraction part.

Elements other than the transmission timing notification part 106 and the urgency control information monitoring part 107 are similar to those described in the first embodiment.

The urgency control information management table according to the present embodiment is similar to one illustrated in FIG. 2.

An example of operation of the BCM 100 according to the present embodiment will be described using specific examples.

Suppose also in the present embodiment that the BCM 100 executes periodical transmission of the shared memory data in a 100 ms cycle with Time T0 as a basis.

Suppose that an application #1 (1000a) corresponds to the urgent transmission condition #1 of the urgency control information management table of FIG. 2, and an application #2 (1000b) corresponds to the urgent transmission condition #2 of the urgency control information management table of FIG. 2.

The transmission timing notification part 106 generates the time slots each of which has 20 ms as the unit of time, which is the shortest allowable delay time according to the urgency control information management table (FIG. 2), within the periodical transmission cycle.

Specifically, the transmission timing notification part 106 generates the time slots each having duration of 20 ms from T0 in the periodical transmission cycle of T0 to T0+100 ms, as illustrated in FIG. 5.

Then, the transmission timing notification part 106 outputs the monitoring timing signal to the urgency control information monitoring part 107, using a switching time from one time slot to another as an urgency control monitoring timing.

The urgency control information monitoring part 107 examines the shared memory 101 to see whether or not urgent transmission condition registered in the urgency control information management table is satisfied, at every urgency control monitoring timing.

The urgency control information monitoring part 107 issues the urgent transmission instruction to the communication part 105 when any piece of control information that matches an urgency control condition exists in the shared memory 101, as a result of the examination.

If however, the urgent transmission instruction and the periodical transmission instruction overlap, in other words, in a time slot that overlaps with the transmission cycle of the periodical transmission, the urgency control information monitoring part 107 does not issue the urgent transmission instruction.

In a time slot where control information that satisfies an urgency control condition does not exist, the urgency control information monitoring part 107 does not perform anything.

As illustrated in FIG. 5, when an urgency control request occurs from the application #1 (1000a) in time slots from T0+20 ms to T0+40 ms, for example, the urgency control information monitoring part 107 checks the shared memory 101 at Time T0+40 ms, detects that the urgent transmission condition is satisfied, and issues the urgent transmission instruction.

As a result, the control information from the application #1 (1000*a*) is transmitted to the DHM 200 at Time T0+40 ms.

If an urgency control request occurs from the application #2 (1000*b*) between time slots Time T0+80 ms and T0+100 ms, the urgency control information monitoring part 107 does not issue the urgent transmission instruction even if the urgency control information monitoring part 107 detects that the urgent transmission condition is satisfied, because a periodical transmission will be performed at Time T0+100 ms.

In the present embodiment, it is described with an assumption that the time required to examine whether an urgent transmission request exists or not is allowably short, but if the examination time is not allowable, a duration of a time slot is set short taking the examination time into consideration.

That is, the duration of the time slot is set shorter by the examination time.

As described above, the transmission timing notification part 106 may divide the transmission cycle into time slots of shorter time than the shortest allowable delay time defined in the urgency control information management table.

The method of the present embodiment may be possible to configure the BCM 100 at a cost lower than the first embodiment because the controlling of the BCM 100 is periodical and simple, even though there is a possibility that a communication load may slightly increase.

Also in the present embodiment, only the shared memory data (control information) that satisfies the urgent transmission condition at the urgency control information transmission timing may be transmitted, as in the first embodiment.

Instead of the above, all of the shared memory data that exist in the shared memory 101 at the urgency control information transmission timing may be transmitted.

As the above, the present embodiment has described that the controller generates a time slot that has the shortest allowable time or a period of time shorter than the shortest allowable time among the allowable delay time defined in the urgency control information management table.

It has been described that when an urgency control output request of the I/O device occurs within the time slot, the controller according to the present embodiment makes an urgent transmission of the data which is integration of the control information of the I/O devices, with a transmission time limit that is the time when the allowable delay time of the control request has passed since a starting time of the time slot, except when transmission may be made with the periodical transmission.

It has been described that in the present embodiment, the monitoring timing is set with a premise that the periodical transmission timing is a standard time.

Embodiment 3

In the first and the second embodiments, it is described that the shared memory is used as a means of data communication, equally in the periodical transmission and in the urgent transmission.

The reason for the above is that the BCM concerned in the present specification transmits a plurality of pieces of urgency control information in one frame.

If an urgent transmission contains only one piece of urgency control information, a message ID (Identifier), and the like may serve for identification.

In the on-vehicle system illustrated in the first and the second embodiments, however, in an urgent transmission, transmission of the control information of the I/O device registered in the urgency control information management table is enough.

In other words, transmission of the control information of the I/O device not registered in the urgency control information management table by the urgent transmission is not necessary because a requirement of a system is satisfied if a transmission is made using the periodical transmission.

Therefore, in the present embodiment, the information of the I/O device registered in the urgency control information management table is shared among the BCM 100 and the DHMs 200, and the shared memory data is compressed and transmission of the compressed data is performed.

Specifically, for example, it is assumed that among bits 0 to n of the shared memory data that is communicated between the BCM 100 and a DHM #1, bits 0 to m (n>m) are transmitted by the urgent transmission.

When an urgent transmission instruction is issued, a communication part 105 of the BCM 100 transmits only control information corresponding to bits 0 to m of the shared memory 101, and the DHM 200 updates only bits 0 to m of a shared memory upon receipt of the control information.

On the other hand, in a case of a periodical transmission, the communication part 105 of the BCM 100 transmits control information that corresponds to bits 0 to n of the shared memory 101, and the DHM 200 updates bits 0 to n of the shared memory upon receipt of the control information.

By what is described, it is possible to make a frame size of the urgent transmission smaller, and is possible to reduce communication traffic.

As the above, the present embodiment has described that the data periodically transmitted is the control information of all of the I/O devices connected to the multiplex transmission apparatus, and data transmitted at the time of the urgent transmission is only the control information of the I/O devices that has been registered in advance as the urgency control information.

Embodiment 4

The present embodiment will illustrate an example where a scheme similar to the transmission of the control information from the BCM 100 to the DHM 200 illustrated in the second embodiment is applied to a transmission of I/O information from the DHM 200 to the BCM 100.

Figure 6:
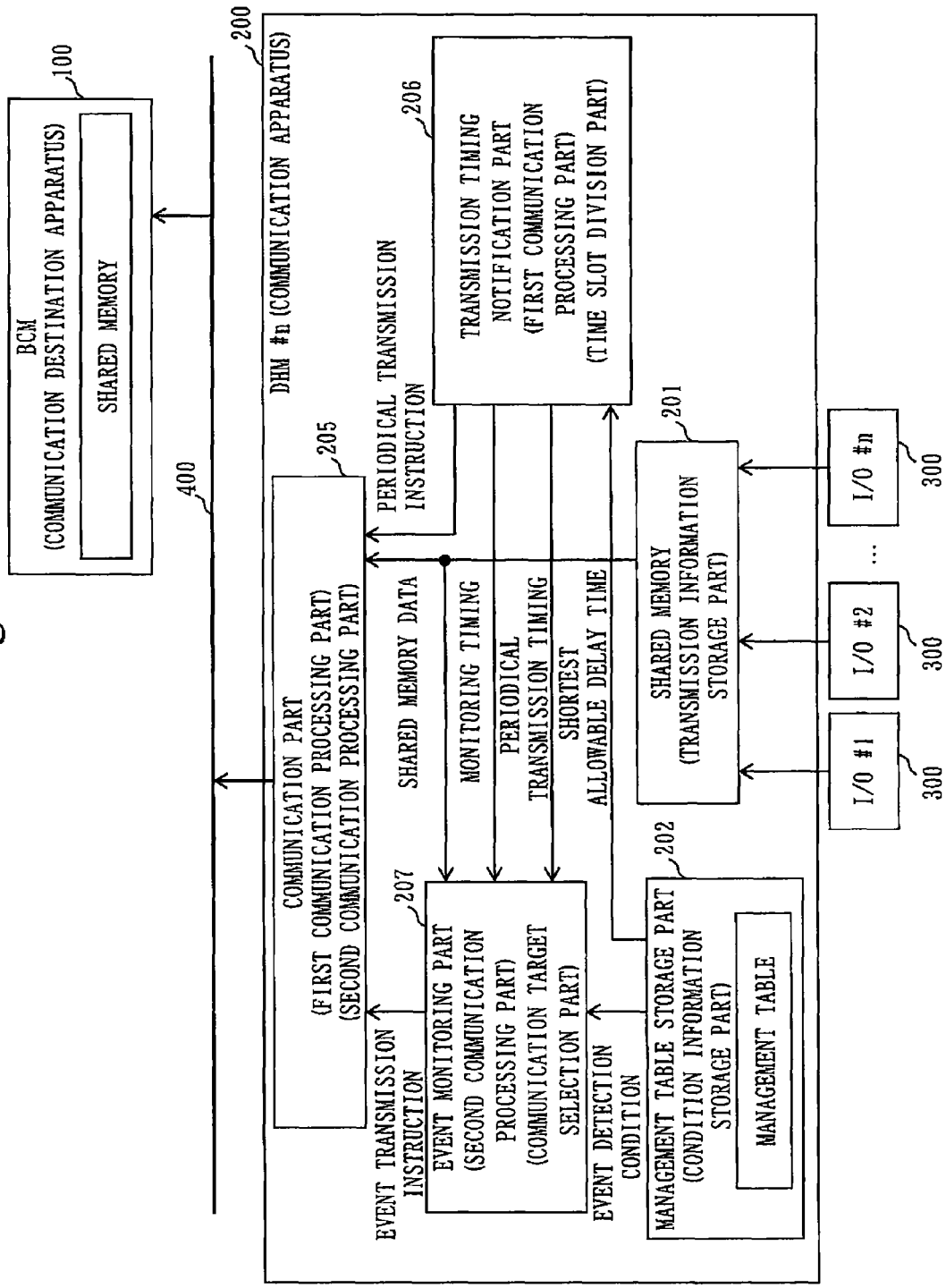
FIG. 6 a diagram illustrating an example of a configuration of an on-vehicle system according to a fourth embodiment.

FIG. 6 illustrates an example of a configuration of an on-vehicle system according to the present embodiment.

A BCM 100, a DHM 200, I/O devices 300, and a multiplex transmission line 400 are similar to those illustrated in FIG. 1.

FIG. 6 illustrates an example of an internal configuration of the DHM 200.

The DHM 200 according to the present embodiment corresponds to an example of a communication apparatus.

The BCM 100 corresponds to an example of a communication destination apparatus.

The DHM 200 according to the present embodiment, stores input information (also referred to as event information) from the I/O device 300 in a shared memory 201 as needed, and transmits the contents of the shared memory

201 to the BCM 100 periodically and by the transmission time limit if input information of the I/O device 300 set in an event transmission condition is detected. The BCM 100 receives shared memory data (the input information) that the DHM 200 transmits, stores the shared memory data in its shared memory, and arranges to enable an application program on the BCM 100 to refer to the input information.

Next, an inside of the DHM 200 of the present embodiment will be described.

The shared memory 201 is a memory that stores input information (transmission information) of a single or a plurality of I/O devices 300 connected to the DHM 200.

The shared memory 201 updates the contents of the memory periodically or every time there is change in the input information from the I/O device.

The contents of the shared memory 201 are transmitted to the shared memory of the BCM 100 periodically or at the time of detecting an event. Therefore, the application 1000 (not illustrated in FIG. 6) on the BCM 100 is possible to obtain the input information of the I/O device 300 of the DHM 200 by reading out the contents of the shared memory of the BCM 100.

Although not specially prescribed, the input information of the I/O device 300 is one bit information of I/O expressing ON/OFF if the input information of the I/O device 300 is a contact input, or multi-bit data of converted digital value obtained by an A/D conversion if the input information of the I/O device 300 is an analog input, for example.

The shared memory 201 is sectioned into areas specified for each I/O device 300.

Furthermore, there is an area for a monitoring target bit in the shared memory 201.

A description on the monitoring target bit will be given later.

In the present embodiment, the I/O device 300 corresponds to an example of the information source, and the shared memory 201 corresponds to an example of the transmission information storage part.

A communication part 205 transmits the input information of the shared memory 201 to the BCM 100 according to a prescribed communication method, after receiving a periodical transmission instruction and an event transmission instruction.

Although not specially prescribed, a communication method corresponding to a CAN may be used, for example.

In the present embodiment, the communication part 205, together with a transmission timing notification part 206, which will be described later, corresponds to an example of the first communication processing part.

The communication part 205, together with an event monitoring part 207, which will be described later, corresponds to an example of the second communication processing part.

A management table storage part 202 stores an event transmission condition management table (referred to as management table in the figures).

The event transmission condition management table is a table where the event transmission condition is described.

The contents of the event transmission condition management table may be set in advance or may be prepared to be set later from the outside or from the BCM 100.

The event transmission condition management table is configured of a monitoring target bit, a detection condition, and an allowable delay time, as illustrated in FIG. 7.

The monitoring target bit indicates a bit location in the shared memory 201.

Each bit location indicated in a monitoring target bit column corresponds to the I/O device 300.

For example, bit 0 corresponds to an I/O device #1, and bit 1 corresponds to an I/O device #2.

And, the input information from the I/O device 300 that corresponds to the bit location indicated in the monitoring target bit column is allowed to be transmitted urgently before periodical transmission cycle arrives.

The I/O device 300 that corresponds to the bit location indicated in the monitoring target bit column corresponds to an example of the urgent transmission information source.

The detection condition is a condition for detecting the event information that should be transmitted urgently.

For example, in an example of an event transmission condition #1, when the I/O device #1 rewrites a value of bit 0 being the monitoring target bit, from 0 to 1, the event monitoring part 207 detects that an urgent transmission is necessary, the event monitoring part 207 will be described later.

The allowable delay time is an allowable delay time between when the event information that should be transmitted urgently is written into the shared memory 201 and when the shared memory data (the event information) is transmitted to the BCM 100.

Time obtained by adding the allowable delay time to the time when the event information is written into a memory of the shared memory 201 is a transmission time limit of the event information.

The event transmission condition management table corresponds to an example of the condition information, and the management table storage part 202 corresponds to an example of the condition information storage part.

The transmission timing notification part 206 performs generation of a periodical transmission instruction timing, output of the periodical transmission instruction to the communication part 205, and generation of an event monitoring timing.

The transmission timing notification part 206 generates a periodical transmission timing in a cycle that has been defined in advance in the on-vehicle system.

Furthermore, the transmission timing notification part 206 generates a time slot whose unit of time is the shortest allowable delay time among the allowable delay time registered in the event transmission condition management table (FIG. 7), within a periodical transmission cycle, for detecting an event, with the periodical transmission timing as a basis.

Then, the transmission timing notification part 206 issues a shared memory data monitoring instruction to the event monitoring part 207 as a monitoring timing signal, in each time slot.

As described, the transmission timing notification part 206 divides a transmission cycle into time slots, each being the shortest allowable delay time defined in the event transmission condition management table, and the transmission timing notification part 206 corresponds to an example of the time slot division part.

The transmission timing notification part 206 issues the periodical transmission instruction to the communication part 205, and also corresponds to an example of the first communication processing part.

The event monitoring part 207 monitors a shared memory 201 in each time slot according to the monitoring timing signal from the transmission timing notification part 106.

Then, the event monitoring part 207 extracts input information that matches an event transmission condition defined in the event transmission condition management table, from the input information written in the shared memory 201.

In addition, the event monitoring part 207 issues an urgent transmission instruction to the communication part 205 for the input information that matches the event transmission condition.

The event monitoring part 207, however, does not issue the urgent transmission instruction in a time slot where periodical transmission is performed, even if the event transmission condition is satisfied.

The event monitoring part 207 is able to detect the time slot where periodical transmission is performed, using an input of a periodical transmission timing signal from the transmission timing notification part 206.

The event monitoring part 207 corresponds to an example of the second communication processing part and the urgent transmission information extraction part.

Next, a relation between occurrence of an event and a transmission of an event will be described using FIG. 8.

Suppose that the DHM 200 according to the present embodiment periodically transmits the shared memory data to the BCM 100 in a 100 ms cycle with Time T0 as a basis.

I/Os #1 through #n are connected to the DHM 200, and input information of each I/O #1 through #n are allotted to bits 0 through bit (n−1) of the shared memory.

Suppose that the event transmission condition management table is set as illustrated in FIG. 7.

The transmission timing notification part 206 generates the time slots each of which has 20 ms as the unit of time, which is the shortest allowable delay time according to the event transmission condition management table (FIG. 7), within the periodical transmission cycle.

Figure 8:
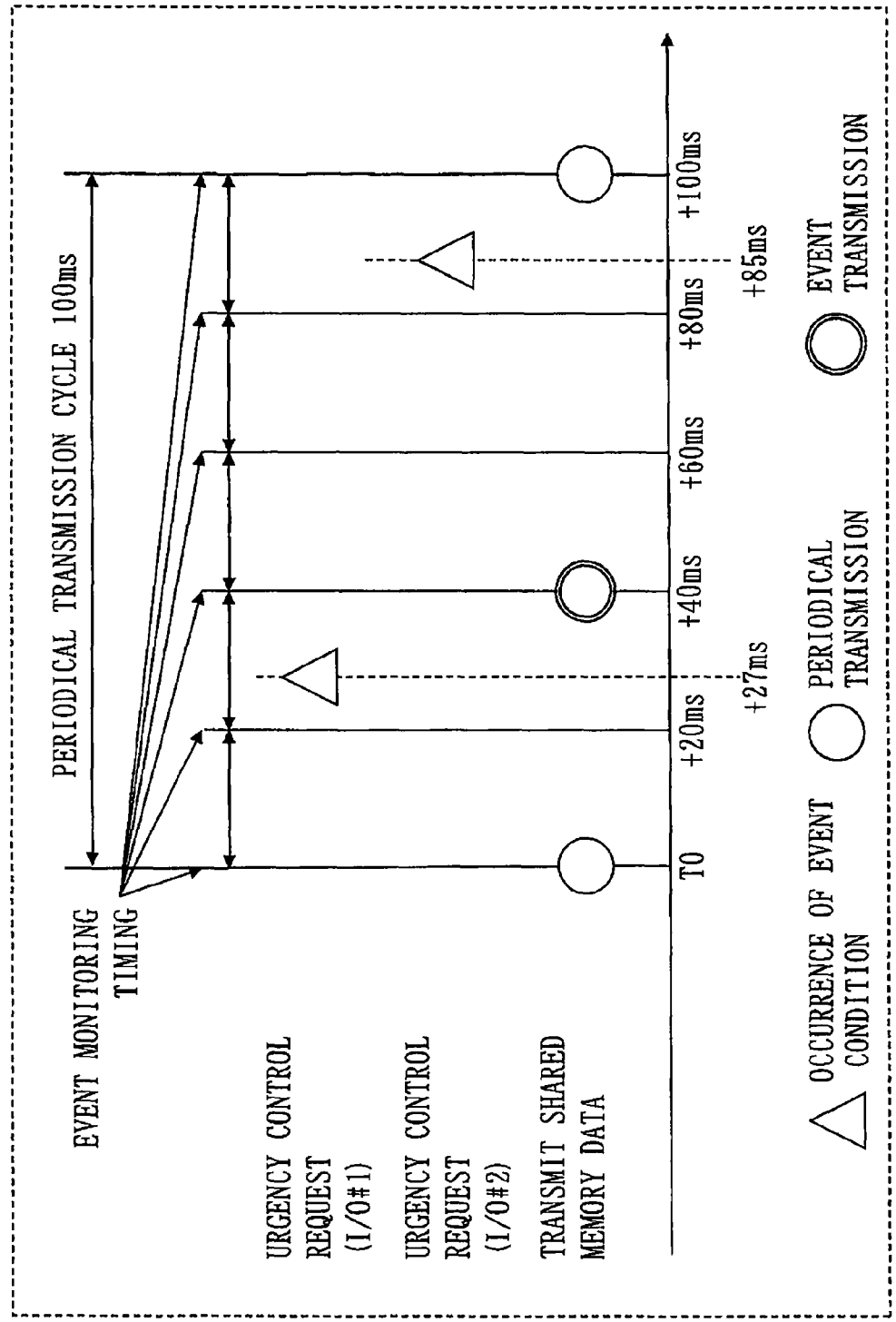
FIG. 8 a diagram illustrating a transmission procedure of event information according to the fourth embodiment.

Specifically, the transmission timing notification part 206 generates the time slots each having duration of 20 ms from T0 in the periodical transmission cycle of T0 to T0+100 ms, as illustrated in FIG. 8.

Then, the transmission timing notification part 206 outputs the monitoring timing signal to the event monitoring part 207, using a switching time from one time slot to another as an event monitoring timing.

The event monitoring part 207 examines the shared memory 201 to see whether or not event transmission condition registered in the event transmission condition management table is satisfied, at every event monitoring timing.

The event monitoring part 207 issues an event transmission instruction to the communication part 205 when any piece of input information that matches an event transmission condition exists in the shared memory 201, as a result of the examination.

If, however, the event transmission instruction and the periodical transmission instruction overlap, in other words, in a time slot that overlaps with the transmission cycle of the periodical transmission, the event monitoring part 207 does not issue the urgent transmission instruction.

In a time slot where control information that matches an event transmission condition does not exist, the event monitoring part 207 does not perform anything.

As illustrated in FIG. 8, suppose that an input of the I/O device #1 changed and a value of bit 0 of the shared memory 201 changed from 0 to 1 at Time T0+27 ms.

The event monitoring part 207 that has received the monitoring timing signal at Time T0+40 ms, detects the event (detects the input information that matches the event transmission condition), and issues the event transmission instruction at Time T0+40 ms.

As a result, the input information from the I/O device #1 is transmitted to the BCM 100 at Time T0+40 ms.

Next, suppose that an input of the I/O device #2 changed and a value of bit 1 of the shared memory 201 changed from 0 to 1 at Time T0+85 ms.

The event monitoring part 207 that has received the monitoring timing signal at Time T0+100 ms, detects that the event transmission condition is satisfied, but at the same time, T0+100 ms is a periodical transmission timing, and therefore the event monitoring part 207 does not issue the event transmission instruction. The event transmission instruction is not issued at Time T0+20 ms, T0+60 ms, or at T0+80 ms because the event monitoring part 207 does not detect that the event transmission condition is satisfied.

By the above, with regard to input information of the I/O device to the BCM 100 from the DHM 200, even if a plurality of event transmission timings occur intensively in a certain period of time, it is possible to prevent a network load from reaching or surpassing a prescribed level by the shared memory transmitting the plurality of pieces of event information collectively.

In addition, it is possible to transmit the input information that should be transmitted urgently, to the BCM 100 within a prescribed time.

Further, also in the present embodiment, a time slot of shorter duration than the shortest allowable delay time may be generated similar to those in the second embodiment.

The present embodiment has described that the multiplex transmission apparatus periodically executes a periodical transmission of the data which is integration of the input information of the I/O devices.

The present embodiment has also described that the multiplex transmission apparatus monitors an input of a particular I/O device, detects an event when a specific input situation is reached, and executes an event transmission of the data which is the integration of the input information of the I/O devices.

Furthermore, the present embodiment has described that the multiplex transmission apparatus sets an event transmission time limit which is time obtained by adding the allowable delay time to the time when the multiplex transmission apparatus detects an event, and that when a single or a plurality of events occur, the multiplex transmission apparatus executes an event transmission of the data which is integration of input information of the I/O devices at an earliest event transmission time limit.

In addition, the present embodiment has described that the multiplex transmission apparatus generates a time slot that has the shortest allowable delay time among the allowable delay time of events or shorter.

Furthermore, the present embodiment has described that, when the multiplex transmission apparatus detects an event in the time slot, the multiplex transmission apparatus executes an event transmission of the data which is integration of input information of the I/O devices, with a transmission time limit that is a time when the allowable delay time has passed since a starting time of the time slot.

Embodiments of the present invention have been described. Of the embodiments, two or more than two embodiments may be combined to put into practice.

Or, of the embodiments, a part of an embodiment may be put into practice.

Or, of the embodiments, parts of two or more than two embodiments may be combined to put into practice.

The present invention is not limited to the embodiments described, and various changes as necessary are possible.

Lastly, an example of a hardware configuration of the BCM 100 and the DHM 200 described in the first through the fourth embodiments will be described by referring to FIG. 9.

The BCM 100 and the DHM 200 are computers and are possible to implement each element of the BCM 100 and the DHM 200 by a program.

The programs may be stored in a storage medium, and the programs may be read from the storage medium by the computer.

In the hardware configuration of the BCM 100 and the DHM 200, a computing apparatus 901, an external storage apparatus 902, a main storage apparatus 903, a communication apparatus 904, and a timer 905 are connected to a bus.

The computing apparatus 901 is a CPU (Central Processing Unit) that executes programs.

The external storage apparatus 902 is, for example, a ROM (Read Only Memory) or a flash memory.

The main storage apparatus 903 is a RAM (Random Access Memory) and corresponds to the share memory 101 and the shared memory 201.

The communication apparatus 904 corresponds to a physical layer of the communication part 105 and the communication part 205.

The timer 905 is used for measuring a transmission cycle of a periodical transmission and for measuring a time slot.

The programs are usually stored in the external storage apparatus 902. The programs as loaded in the main storage apparatus 903 are read into the computing apparatus 901 sequentially and executed.

The programs are those that implement functions each described as " . . . part" (excluding "management table storage part" and the same for the functions each described as " . . . part" hereinafter) illustrated in FIG. 1, FIG. 4, and FIG. 6.

Furthermore, an operating system (OS) is also stored in the external storage apparatus 902. At least a part of the OS is loaded into the main storage apparatus 903, and the computing apparatus 901 executes the programs each of which implements the function of " . . . part" illustrated in FIG. 1, FIG. 4, and FIG. 6 while executing the OS.

The information, data, signal values, and variable values representing the results of processes that are explained as "determination of . . . ", "detection of . . . ", "extraction of . . . ", "comparison of . . . ", "setting of . . . ", "registration of . . . ", "selection of . . . ", "generation of . . . ", "division of . . . ", "inputting of . . . ", "updating of . . . ", and the like, in the description of the first through the fourth embodiments are stored in the main storage apparatus 903 as a file.

An encryption key/decryption key, random values, and parameters may be stored in the main storage apparatus 903 as a file.

Figure 9:
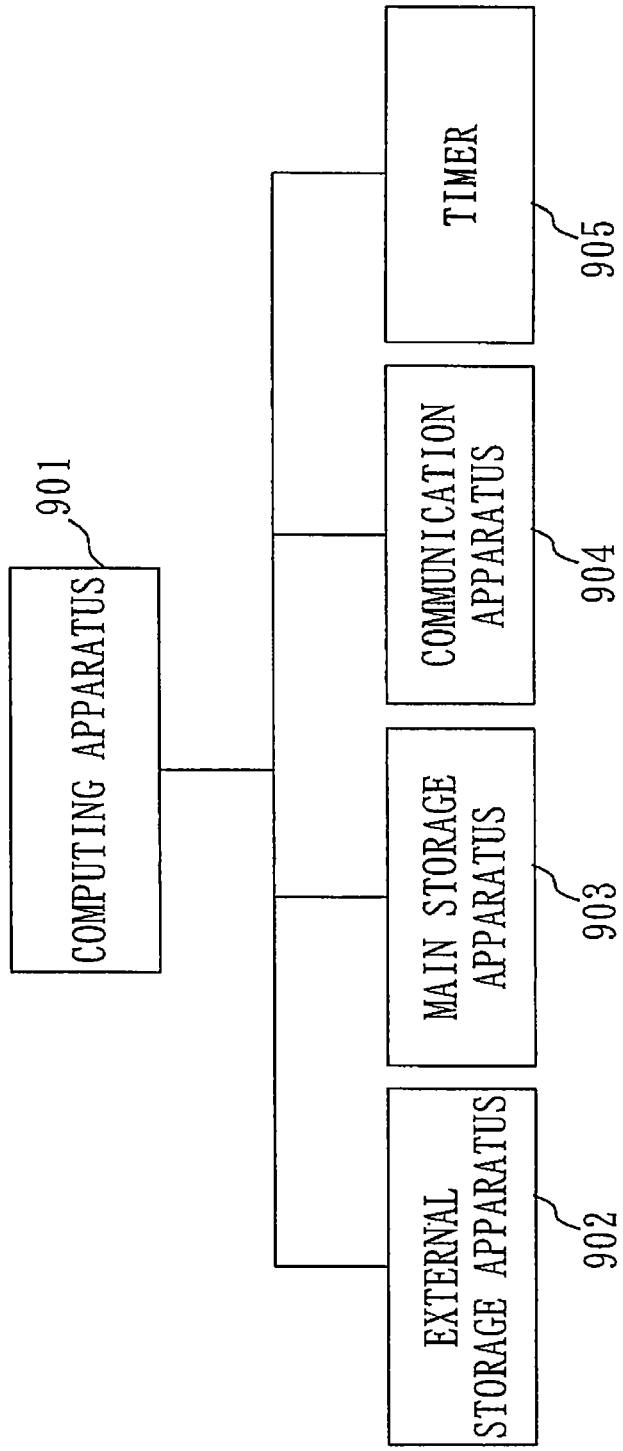
FIG. 9 a diagram illustrating an example of a hardware configuration of a BCM and a multiplex transmission apparatus according to the first through the fourth embodiments.

The configuration of FIG. 9 illustrates only an example of the hardware configuration of the BCM 100 and the DHM 200. The hardware configuration of the BCM 100 and the DHM 200 may have another configuration, not limited to the configuration illustrated in FIG. 9.

The first through the fourth embodiments described a method to improve efficiency of a data transmission in an on-vehicle system, but the application target of the method described in the first through the fourth embodiments is not limited to the on-vehicle system.

REFERENCE SIGNS LIST

100: BCM, 101: shared memory, 102: management table storage part; 103: periodical communication processing part, 104: urgent communication processing part, 105: communication part, 106: transmission timing notification part, 107: urgency control information monitoring part, 200: DHM, 201: shared memory, 202: management table storage part, 205: communication part, 206: transmission timing notification part, 207: event monitoring part, 300: I/O device, 400: multiplex transmission line, 1000: application

The invention claimed is:

1. A communication apparatus comprising: a transmission information storage circuit where transmission information from a plurality of information sources is written as needed;
   a first communication processing circuit that transmits the transmission information written in the transmission information storage circuit to a communication destination apparatus in each transmission cycle which is constant;
   a condition information storage circuit that stores condition information that defines an urgent transmission information source which is an information source that is permitted to transmit the transmission information urgently before arrival of the transmission cycle, among the plurality of information sources, and defines an allowable delay time for each urgent transmission information source, which is a delay time allowable at an urgent transmission;
   a time slot division circuit that divides the transmission cycle into time slots, each of which is equal to or shorter than a shortest allowable delay time defined by the condition information;
   an urgent transmission information extraction circuit that extracts in a unit of individual time slot, urgent transmission information which is transmission information from a plurality of urgent transmission information sources and needs to be transmitted urgently, from among the transmission information written in the transmission information storage circuit; and a second communication processing circuit that transmits in the unit of individual time slot, the urgent transmission information extracted by the urgent transmission information extraction circuit to the communication destination apparatus before arrival of the transmission cycle.

2. The communication apparatus according to claim 1, wherein
   the second communication processing circuit transmits the urgent transmission information extracted by the urgent transmission information extraction circuit, and at least one other transmission information that exist in the transmission information storage circuit to the communication destination apparatus, in the unit of individual time slot.

3. The communication apparatus according to claim 2, wherein the second communication processing circuit transmits the urgent transmission information extracted by the urgent transmission information extraction circuit and transmission information from a plurality of urgent transmission information sources to the communication destination apparatus, in the unit of individual time slot.

4. The communication apparatus according to claim 1, wherein
   the second communication processing circuit transmits the urgent transmission information extracted by the urgent transmission information extraction circuit and all other transmission information that exist in the transmission information storage circuit to the communication destination apparatus, in the unit of individual time slot.

5. The communication apparatus according to claim 1, wherein
the urgent transmission information extraction circuit does not extract the urgent transmission information in a time slot that overlaps with arrival of a transmission cycle.

6. Tire communication apparatus according to claim 1, wherein the communication apparatus is a BCM (Body Control Module) that is included in an on-vehicle system which includes a multiplex transmission apparatus connected to an I/O (Input/Output) device, and that transmits information for controlling the I/O device written in the transmission information storage circuit by a plurality of application programs that are included in the plurality of information sources, to the multiplex transmission apparatus that is the communication destination apparatus.

7. The communication apparatus according to claim 1, wherein
the communication apparatus is a multiplex transmission apparatus that is connected to a plurality of I/O (Input/Output) devices which are the plurality of information sources that is included in an on-vehicle system which includes a BCM (Body Control Module), and that transmits information from the plurality of I/O devices written in the transmission information storage circuit by the plurality of I/O devices to the BCM which is the communication destination apparatus.

8. A control apparatus comprising:
a transmission information storage circuit where transmission information to be transmitted for controlling a control target equipment is written by a plurality of information sources as needed;
a first communication processing circuit that transmits the transmission information written in the transmission information storage circuit to a relay apparatus connected to the control target equipment in each transmission cycle which is constant;
a condition information storage circuit that stores condition information that defines an urgent transmission information source which is an information source that is permitted to transmit the transmission information urgently before arrival of the transmission cycle, among the plurality of information sources, and defines an allowable delay time for each urgent transmission information source, which is a delay time allowable at an urgent transmission;
an urgent transmission information extraction circuit that extracts urgent transmission information which is transmission information from the urgent transmission information source and needs to be transmitted urgently, from among the transmission information written in the transmission information storage circuit; and
a second communication processing circuit that transmits the urgent transmission information extracted by the urgent transmission information extraction circuit to the relay apparatus before arrival of the transmission cycle, and before a transmission time limit which is a timing when the allowable delay time defined for the urgent transmission information source in the urgent transmission information passes since the urgent transmission information is extracted by the urgent transmission information extraction circuit.

9. The control apparatus according to claim 8, wherein
the urgent transmission information extraction circuit may extract two or more than two pieces of urgent transmission information, and
the second communication processing circuit, when the two or more than two pieces of urgent transmission information are extracted by the urgent transmission information extraction circuit, transmits the two or more than two pieces of urgent transmission information to the relay apparatus before the transmission time limit that arrives earliest in the two or more than two transmission time limits of the two or more than two pieces of urgent transmission information.

10. The control apparatus according to claim 8, wherein
the urgent transmission information extraction circuit determines which of the transmission time limit of the urgent transmission information extracted or a next transmission cycle arrives first, at a time of extracting the urgent transmission information,
the second communication processing circuit transmits the urgent transmission information to the relay apparatus before the transmission time limit, when the transmission time limit of the urgent transmission information is determined to arrive before the next transmission cycle by the urgent transmission information extraction circuit, and
the first communication processing circuit transmits the urgent transmission information to the relay apparatus in the next transmission cycle, when the arrival of the transmission time limit and the arrival of the next transmission cycle are determined to be at the same time by the urgent transmission information extraction circuit, or when the next transmission cycle is determined to arrive before the transmission time limit by the urgent transmission information extraction circuit.

11. The control apparatus according to claim 8, wherein
the second communication processing circuit transmits the urgent transmission information extracted by the urgent transmission information extraction circuit, and other transmission information that exist in the transmission information storage circuit to the relay apparatus.

12. The control apparatus according to claim 11, wherein
the second communication processing circuit transmits the urgent transmission information extracted by the urgent transmission information extraction circuit and transmission information from other urgent transmission information sources to the relay apparatus.

13. The control apparatus according to claim 8, wherein
the control apparatus is a BCM (Body Control Module) that is included in an on-vehicle system including a multiplex transmission apparatus connected to an I/O (Input/Output) device being the control target equipment, and that transmits information for controlling the I/O device written in the transmission information storage circuit by a plurality of application programs which are included in the plurality of information sources, to a multiplex transmission apparatus which is the relay apparatus.

14. A non-transitory computer-readable storage medium storing computer-readable instructions thereon, which, when executed by a computer, cause the computer to function as the communication apparatus according to claim 1.

15. A non-transitory computer-readable storage medium storing computer-readable instructions thereon, which, when executed by a computer, cause the computer to function as the control apparatus according to claim 8.

* * * * *